(12) United States Patent
Rastegar et al.

(10) Patent No.: US 9,455,654 B2
(45) Date of Patent: Sep. 27, 2016

(54) ON THE DYNAMIC RESPONSE OF ACTUATION DEVICES IN NONLINEAR DYNAMICS SYSTEMS

(71) Applicants: Jahangir S Rastegar, Stony Brook, NY (US); Dake Feng, Kings Park, NY (US)

(72) Inventors: Jahangir S Rastegar, Stony Brook, NY (US); Dake Feng, Kings Park, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 14/301,304

(22) Filed: Jun. 10, 2014

(65) Prior Publication Data

US 2015/0008852 A1 Jan. 8, 2015

Related U.S. Application Data

(60) Provisional application No. 61/833,391, filed on Jun. 10, 2013.

(51) Int. Cl.
 *G05B 5/01* (2006.01)
 *H02P 6/08* (2016.01)
 *B25J 9/16* (2006.01)

(52) U.S. Cl.
 CPC ............... *H02P 6/08* (2013.01); *B25J 9/1628* (2013.01); *H02P 2207/05* (2013.01)

(58) Field of Classification Search
 CPC ..... B25J 9/1633; G11B 7/0941; G11B 5/588
 See application file for complete search history.

(56) References Cited

U.S. PATENT DOCUMENTS

| | | | |
|---|---|---|---|
| 5,239,246 A * | 8/1993 | Kim ......................... | 318/568.11 |
| 2015/0008852 A1* | 1/2015 | Rastegar .................. | H02P 6/08 318/400.04 |

* cited by examiner

*Primary Examiner* — Karen Masih

(57) ABSTRACT

A method for actuating a motor including: separating feed-forward signals corresponding to motion independent components of a required actuating force/torque from motion dependent components; filtering the motion dependent components of the feed-forward signals to at least reduce high frequency signals generated due to feedback signals; and either not filtering or filtering with a low pass filter having a higher cut off frequency the motion independent components of the feed-forward signals to at least reduce higher frequency noise and components; wherein higher frequency components of electronic power amplifier signals corresponding to the motion independent components of the actuating forces/torques are not eliminated by the low pass filter, thereby ensuring that the reaction forces/torques are provided to actuate the motor.

18 Claims, 6 Drawing Sheets

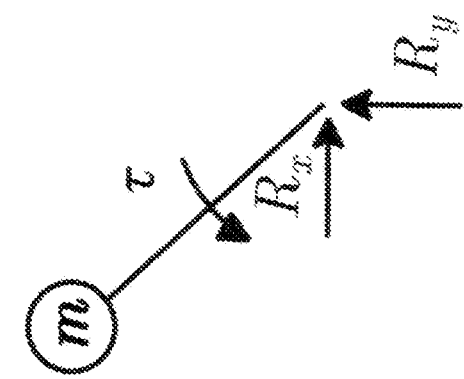
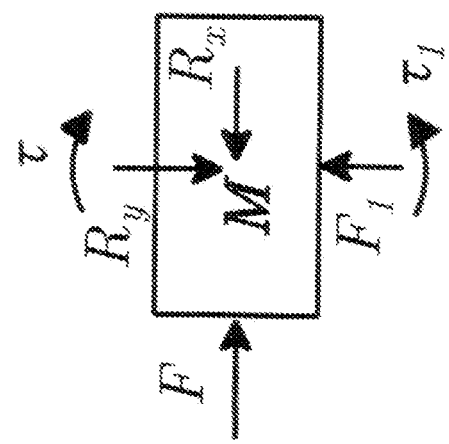
Figure 2a
Figure 2b

ON THE DYNAMIC RESPONSE OF ACTUATION DEVICES IN NONLINEAR DYNAMICS SYSTEMS

CROSS-REFERENCE TO RELATED APPLICATION

This application claims the benefit to U.S. Provisional Application No. 61/833,391 filed on Jun. 10, 2013, the entire contents of which is incorporated herein by reference.

BACKGROUND

1. Field of the Invention

The present invention relates generally to actuation devices, and more specifically to the dynamic response of actuation devices in nonlinear dynamics systems.

2. Prior Art

The dynamics of actuation devices of different types have been extensively studied. A comprehensive review of studies related to different types of electrical motors is known in the art. Furthermore, different methods have been studied for synthesizing trajectory and control mechanical systems with nonlinear dynamics such as robot manipulators. For example, formulation of inverse dynamics and model-based feed-forward control of dynamics systems such as robot manipulator have been studied and trajectory synthesis for minimal actuation force/torque harmonics developed using Trajectory Pattern Method (TPM).

However, dynamic response issues have not been fully explained for nonlinear dynamics systems, including mechanical systems such as robot manipulators. In most current approaches to path and trajectory synthesis and control of mechanical systems, methods used for linear dynamics systems are generally employed while treating the effects of nonlinearity as input disturbances. For highly nonlinear dynamics systems, this usually means that the system operation must be relatively slow to ensure stability and effectiveness of the control system in providing operational precision. Model based feed-forward control algorithms are also used to minimize the effects of the nonlinear components of the system dynamics and to achieve better system performance in terms of operating speed and precision.

The lack of full understanding of the dynamic response characteristics and limitations of the actuation systems of mechanical systems with highly nonlinear dynamics, however, significantly reduces the effectiveness of their control system.

SUMMARY

This disclosure presents a totally new approach at studying the dynamic response requirements of mechanical systems with open-loop kinematic chain and nonlinear dynamics, such as robot manipulators. It is shown that the dynamic response requirements of the system actuators can be associated with two different groups of components. The first group is shown to correspond to the components of each actuator force/torque that is actuator motion independent. The dynamic response of this group of components of the actuating forces/torques is shown to be limited only by the dynamic response limitations—for the case of electrically driven actuation systems—of the driving power amplifiers, electronics, computational and signal processing devices and components. The second group corresponds to the components of each actuator force/torque that is actuator motion dependent. The dynamic response of this group of components of the actuator forces/torques is limited mainly by the effective inertia that is experienced by the actuator and its operating speed. Due to the nature of the currently available electrical, hydraulic and other actuation systems, the dynamic response of actuation systems is shown to be generally high to the former group of components and significantly lower to the latter group of components.

The justification for dividing the actuation forces/torques into the aforementioned two groups of components and methods for their derivation for mechanical systems with serial rigid links are disclosed herein. The reasons for dividing the actuation forces/torques into these two groups for understanding the dynamic response characteristics and limitations of mechanical systems with nonlinear dynamics are presented. The present disclosure also illustrates the need for the development of a new approach for feed-forward control of mechanical systems, such as robot manipulators, for achieving significantly higher performance in terms of speed and precision. Examples are also presented together with the discussion of the related topics of interest and future work

BRIEF DESCRIPTION OF THE DRAWINGS

These and other features, aspects, and advantages of the apparatus and methods of the present invention will become better understood with regard to the following description, appended claims, and accompanying drawings where:

FIGS. 2a and 2b illustrate free body diagrams of the pendulum system of FIG. 1.

DETAILED DESCRIPTION

Actuator Motion-Dependent and Motion-Independent Components

Figure 1:
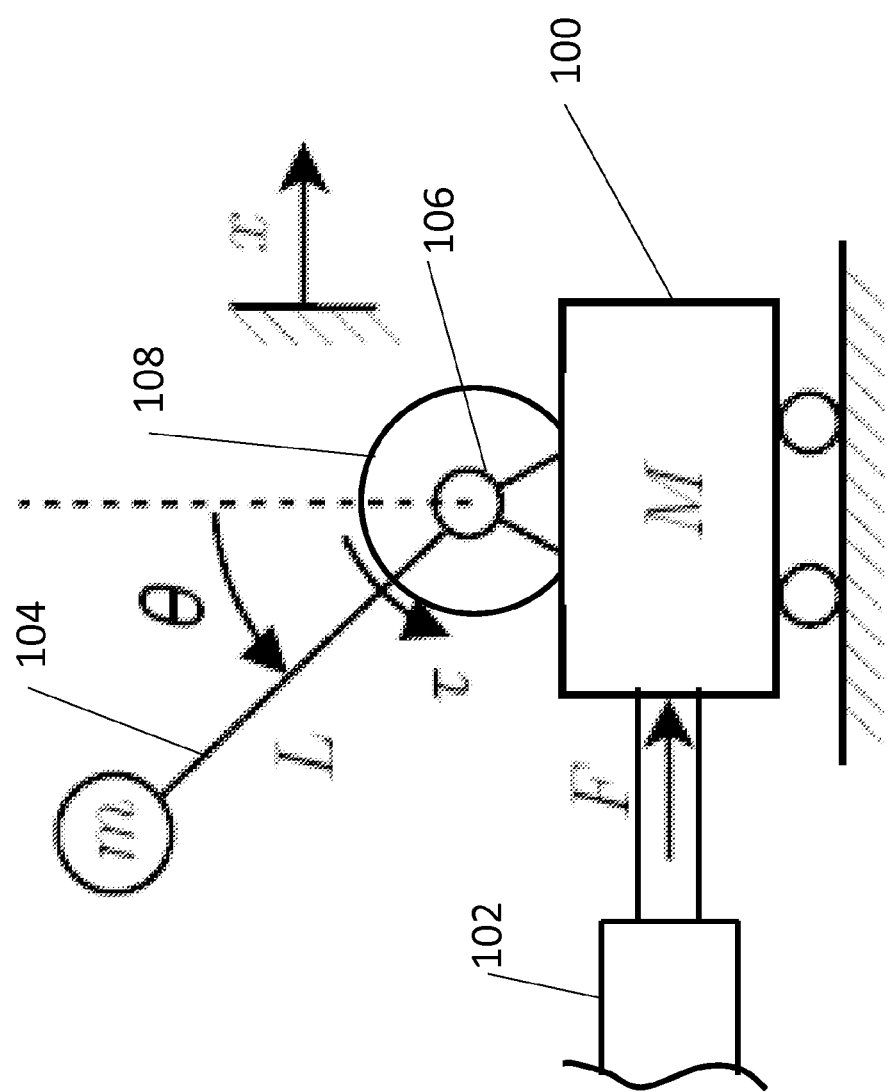
FIG. 1 illustrates a planar inverse pendulum system.

Motion-dependent components and motion-independent components of an actuator force/torque of a mechanical system will now be described by way if an example. Namely, the two degrees-of-freedom planar inverse pendulum system shown in FIG. 1. The rigid cart 100 has a mass M and is acted on by a linear actuator 102 providing the force F. The link (pendulum) element 104 is considered to be massless and connected to the cart 100 with a revolute joint 106, have a length L with an end mass m that can be assumed to be concentrated at the link end 104 as shown in FIG. 1. The pendulum link 104 is considered to be actuated by a rotary motor 108 that applies a torque $\tau$ to the link 104 at the revolute joint 106. The displacement of the cart 100 relative to the ground 110 and the rotation of the pendulum link 104 relative to the cart 100 are indicated as x and $\theta$, respectively.

The free body diagram of the inverse pendulum system of FIG. 1 is shown in FIGS. 2a and 2b, respectively, where $F_1$ and $\tau_1$ are ground reaction force and torque and $R_x$ and Ry are the reaction forces at the pendulum revolute joint 106. For the sake of simplicity, the revolute joint 106 is considered to be located at the center of mass of the cart 100, where the actuation force F also acts.

Now consider the case in which the cart 100 is held stationary and the pendulum link 104 is undergoing a simple harmonic motion with an amplitude a given by $$\theta = a \cos \omega t \quad (1)$$

From the free body diagram of FIG. 2, the required actuation force F acting on the cart 100 and the actuating torque τ acting on the pendulum link 104 at the revolute joint 106 are readily seen to be $$F = mL(\ddot{\theta}\cos\theta - \dot{\theta}^2\sin\theta) \quad (2)$$
$$= 4amL\omega^2[\cos\omega t \cos(a\cos\omega t) + a\sin^2\omega t \sin(a\cos\omega t)]$$
$$= c_1\cos\omega t + c_2\cos 3\omega t + c_3\cos 5\omega t + \dots$$

$$\tau = mL^2\ddot{\theta} = -amL\omega^2\cos\omega t \quad (3)$$

As can be seen in Eqn. (2), the actuating force F is a nonlinear function of the rotary joint motion θ (and any externally applied force, if any) and for the simple harmonic motion Eqn. (1), it must generally provide an actuation force that could contain several harmonics of the fundamental harmonic of the motion Eqn. (1) with significant amplitude. It is also noted that the force F is provided by the linear actuator 102 driving the cart 100 while the cart 100 is stationary. Which means that the force F is generated by the motor power electronics by properly varying its electromagnetic forces as described in Appendix A. In the present case, the force F described by Eqn. (2) is in fact a reaction force required to keep the cart 100 stationary as the pendulum link 104 undergoes the simple harmonic motion Eqn. (1). Such components of an actuation force/torque are hereinafter referred to as the motion independent component of the actuating force/torque.

In general, the dynamic response of a properly designed power electronics system driving a DC motor or the like is significantly higher than the dynamic response of the mechanical system. The dynamic response of actuation devices are relatively high to the required motion independent components of the actuating forces/torques. As a result, the cart actuator can be expected to provide the higher harmonics of the required force, Eqn. (2), even for a relatively large amplitude or high fundamental frequency motions Eqn. (1).

On the other hand, as can be seen in Eqn. (3), the actuating torque is a function of its related joint motion—acceleration in this case. In this case, the actuating torque τ is required to accelerate the pendulum link 104 with the moment of inertia $mL^2$ about its axis of rotation, which then causes the link 104 to undergo its prescribed harmonic motion Eqn. (1) with its associated varying joint velocity. As is shown in Appendix A, the dynamic response of an actuator that has to accelerate a load (an effective inertia) and maintain certain constant or varying joint velocity is limited by the amount of effective load (effective inertia) and the joint velocity, both of which components may be varying. These components of an actuation force/torque are hereinafter referred to as the motion dependent component of the actuating force/torque.

It is noted that for the sake of simplicity, in the above discussion of dynamic response limitations of the actuation devices the current and voltage limitations of the power electronics and related components—for the case of electrically driven actuation devices—are not considered. That is, the system is considered to be operating within such limitations. Such an assumption does not alter the present actuation force component division into motion dependent and motion independent components. The effects of such limitations are, however, discussed in the Appendix A.

Now for the case of the cart undergoing a simple harmonic motion x=b cos(ω t) while the pendulum link 104 is held stationary relative to the cart 100 at an angle θ=0 (see FIG. 1), the aforementioned required actuating force and torque are readily seen to be $$F = (M+m)\ddot{x} = -(M+m)b\omega^2 \cos \omega t \quad (4)$$

$$\tau = mL\ddot{x} = -mLb\omega^2 \cos \omega t \quad (5)$$

It is then readily observed that the required actuating torque τ is a reaction torque that is needed to keep the pendulum link 104 at the angle θ=0, and consists only of a motion independent component, Eqn. (5), and the dynamic response of its motor for providing the required torque is relatively high and dependent only on the dynamic response of its power electronics and related components.

The actuating force F on the other hand consists only of a motion dependent component, Eqn. (4), and its dynamic response is relatively low and dependent on the amount of load (inertia M+m) and its varying velocity as indicated in Appendix A.

Now if neither the cart 100 nor the pendulum link 104 are stationary, the system equations of motion become $$F = M\ddot{x} + mL(\ddot{\theta}\cos\theta - \dot{\theta}^2\sin\theta) + m\ddot{x} \quad (6)$$
$$= mL(\ddot{\theta}\cos\theta - \dot{\theta}^2\sin\theta) + (M+m)\ddot{x}$$
$$= F_{MI} + F_{MD}$$

$$\tau = mL\ddot{x}\cos\theta + mL^2\ddot{\theta} = \tau_{MI} + \tau_{MD} \quad (7)$$

where $$F_{MI} = mL(\ddot{\theta}\cos\theta - \dot{\theta}^2\sin\theta)$$

and $$F_{MD} = (M+m)\ddot{x}$$

are the motion independent component and the motion dependent component, respectively, of the actuating force F acting on the cart 100.

Similarly, $$\tau_{MI} = mL\ddot{x}\cos\theta$$

and $$\tau_{MD} = mL^2\ddot{\theta}$$

are the motion independent component and motion dependent component, respectively, of the actuating torque acting on the pendulum link 104.

The above separation of the actuating forces/torques into the two groups of motion independent components and motion dependent components provides the means of determining the dynamic response characteristics of such mechanical systems with highly nonlinear dynamics. As is shown in Appendix A, since the generation of the motion independent components of the actuating forces/torques is limited only by the dynamic response limitations of the actuator power electronics, the actuator can provide this component at relatively high frequencies demanded by the nonlinearity in the system dynamics, as for example can be seen in Eqn. (2) and Eqn. (6). However, the dynamic response of an actuator in generating the motion dependent components of the actuating forces/torques is dependent on the instantaneous actuating load (effective inertia on which it acts) and the instantaneous speed of the actuator motion.

The separation of the required actuating forces/torques into the aforementioned two groups of motion independent components and motion dependent components clearly indicates the need for a new approach to the formulation of feed-forward control signal in feed-forward control systems of mechanical systems with nonlinear dynamics that considers the dynamics response characteristics and limitations of the actuating devices such as different types of electric motors and their commonly used electronic power amplifier drivers. The general design of such feed-forward control systems and their superior performance is shown by the following example.

Example and Simulation

Figure 3:
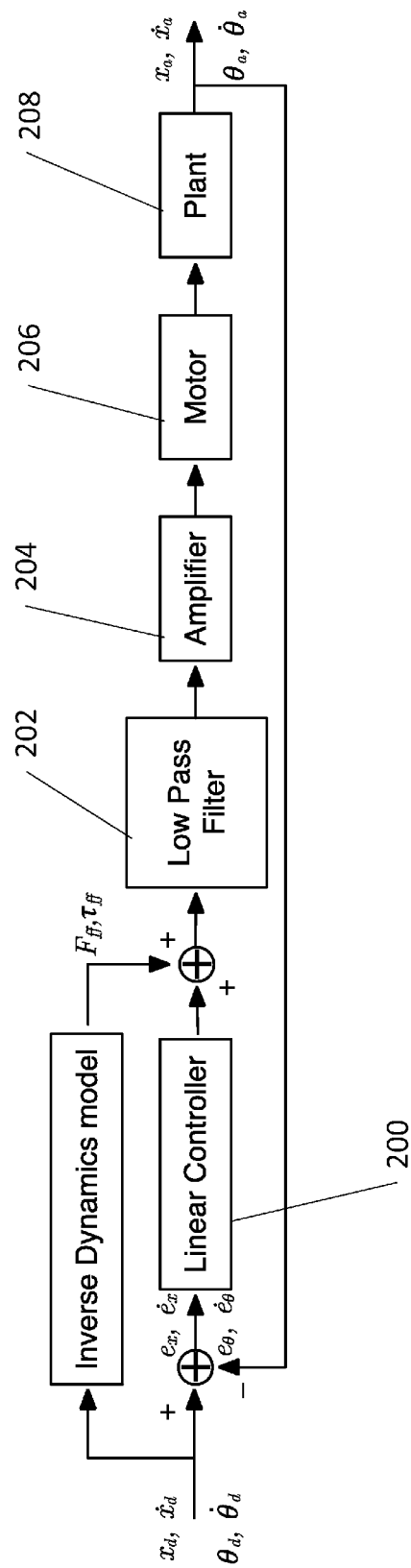
FIG. 3 illustrates a block diagram of a commonly used feed-forward control system.

Consider the inverse pendulum system of FIG. 1. The conventional approach for constructing a model-based feed-forward control with a linear feedback loop is shown in the block diagram of FIG. 3. In this control system, the input desired motion $x_d$ and $\theta_d$ and their related velocities and accelerations are used in the system equations of motion Eqn. (6) and Eqn. (7) to calculate the feed-forward force $F_{ff}$ and torque $\tau_{ff}$, respectively. In the block diagram of FIG. 3, the actual position of the cart 100 and the pendulum link 104 are indicated as $x_a$ and $\theta_a$, respectively. Their corresponding error signals, i.e., the difference between the desired and actual positions $e_x$ and $e_\theta$ and related velocities are fed back through a (usually a linear PD) controller 200. The sum of the feed-forward and the feedback signals is then sent to the electronic power amplifier 204 via a low pass filter 202, which is used to remove the high frequency components of the signal that are considered to be beyond the dynamic response capability of the system actuators and that may excite natural modes of vibration of the system. In a system constructed as shown in FIG. 3, the low pass filter also serves to filter other high frequency noises and disturbances. The electronic power amplifiers will then convert the filtered control signal to power signals to drive the actuating motors 206 to produce the required actuating force and torque to drive the plant 208.

As was shown above, the feed-forward signal, which is generated using the system equations of motion, Eqn. (6) and Eqn. (7), contain high frequency components generated by the motion independent components of the required actuation force/torque, which are critical for generating the desired system motion. The commonly used feed-forward control systems shown in the block diagram of FIG. 3, however, simply filters all high frequency components of the feed-forward signal, thereby degrading the system performance in terms of speed of operation and precision.

Figure 4:
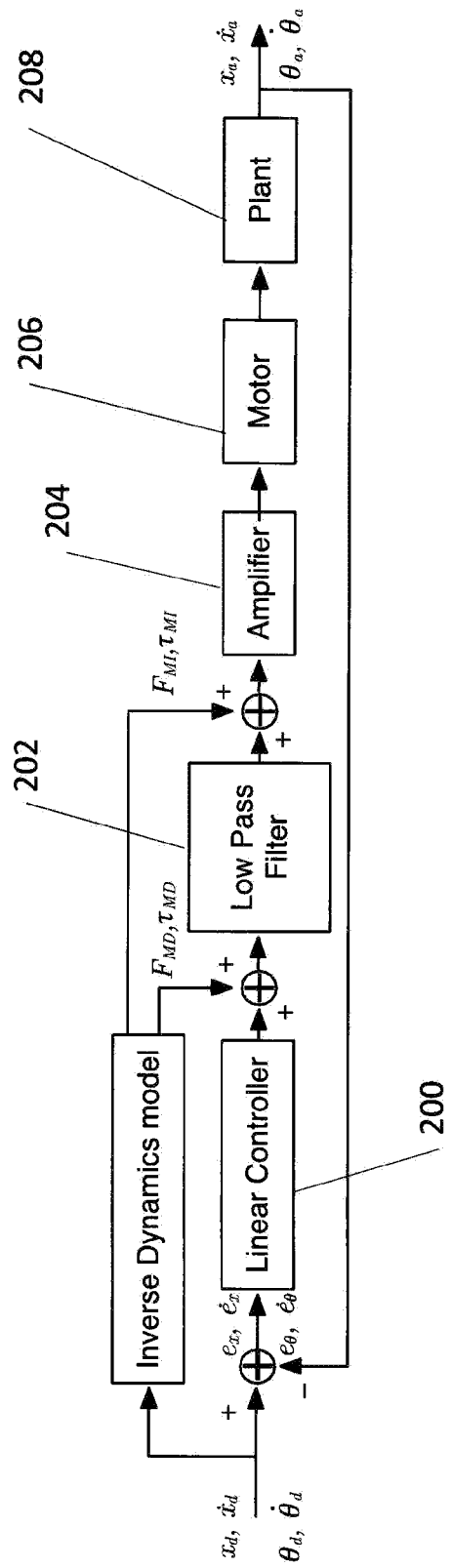
FIG. 4 illustrates an embodiment of a block diagram of a feed-forward control system.

The block diagram of a feed-forward control system is shown in the block diagram of FIG. 4. In this control system, the feed-forward signals corresponding to the motion independent components of the required actuating force/torque, i.e., $F_{MI}$ and $\tau_{MI}$ in Eqn. (6) and Eqn. (7), respectively, are separated from those of motion dependent components, i.e., $F_{MD}$ and $\tau_{MD}$ in Eqn. (6) and Eqn. (7), respectively. The motion dependent components of the feed-forward signals are then similarly filtered with a low pass filter 202 to eliminate noise and other high frequency signals that may have been generated due to the feedback signals. The motion independent components of the feed-forward signals are however either not filtered or preferably filtered with a low pass filter with significantly higher cut off frequency to eliminate higher frequency noise and components that may have been generated due to the digital nature of currently used control systems and if actual positions and velocities are not used to minimize step-like signals at each sampling time. As a result, the higher frequency components of the electronic power amplifier signals corresponding to the motion independent components of the actuating forces/torques are not eliminated by the low pass filter, thereby ensuring that the aforementioned and mainly reaction forces/torques are provided by the system actuators.

In the present example, the desired motion of the system of FIG. 1 is considered to be given as $$x_d = 0.1\left(\cos 3t - \frac{1}{9} 9t\right) \tag{8}$$

$$\theta_d = 0.6\left(\cos 12t - \frac{1}{9}\cos 36t\right) \tag{9}$$

The system parameters are considered to be given as M=10 Kg, m=1 Kg and L=0.4 m. Both actuators are considered to be brushless DC motors with rotor inertia of J=0.35 Kg-cm$^2$, and parameters K=0.115 N-m/amp, L=7.7 mH, R=4 ohms, and $I_{max}$=12.3 amp (see FIG. 6).

The electronic power amplifier 204 is considered to allow a maximum voltage of $V_{max}$=50 Volts and provide a peak power of $P_{peak}$=600 Watt. A gear with radius 0.02 m and a matching rack convert the rotary output from the motor to linear motion of the cart and its effective inertia is considered to be included in the mass of the cart M. The PD controller proportional and derivative gain are selected to be 1000 and 100, respectively. A second order unit gain low pass filter 202 with un-damped natural frequency $\omega_n$=100 rad/s and the quality factor Q=1 is used.

Figure 5:
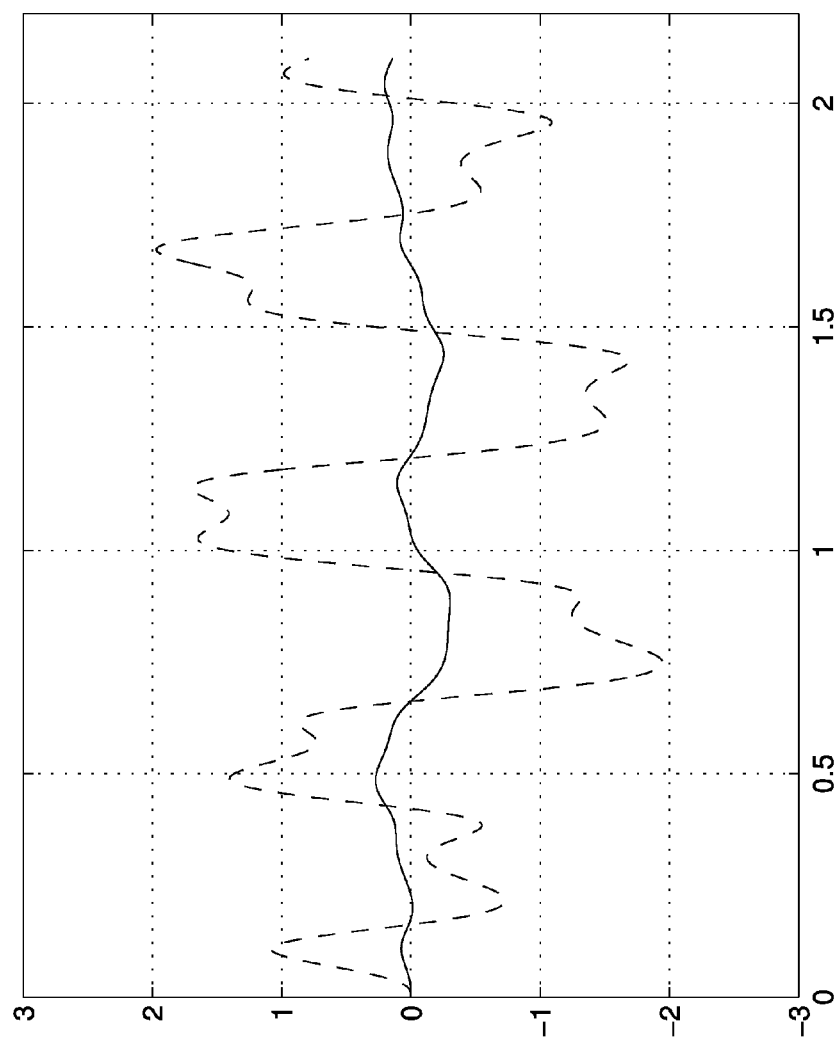
FIG. 5 illustrates a graph of the position error $e_x$ for the control systems of FIG. 3 and FIG. 4.

Computer simulation was performed the control systems shown in FIG. 3 and FIG. 4 for the aforementioned desired motion. As expected, both position and velocity errors were found to be significantly smaller with the feed-forward control system with the separated motion dependent and motion independent components, as shown in FIG. 4. For example, the larger cart position error $e_x$ for both control system simulations are shown in the plot of FIG. 5. In this plot, the error $e_x$ is plotted with solid line for the control system of FIG. 4, and with dashed lines for the conventionally used control system of FIG. 3.

A close examination of the plots of the error $e_x$ of FIG. 5 and examination of the computer simulation results also indicates that for the conventionally used feed-forward control system of FIG. 3, the cart position error $e_x$ is mainly due to the filtered, but required, high frequency components of the motion independent component of the actuating forces.

The present disclosure clearly shows that the actuation forces/torques provided by actuation devices driving mechanical systems can be divided into two basic groups. The first group corresponding to those components of each actuator force/torque that is "actuator motion independent". The dynamic response of this group is shown to be relatively high and limited only by the dynamic response limitations—for the case of electrically driven actuation systems—of the driving power amplifiers, electronics, computational and signal processing devices and components. And the second group corresponding to those components of the actuator forces/torques that is "actuator motion dependent". The dynamic response of the latter group is shown to be relatively low and dependent on the actuator effective inertial load and actuation speed. In all mechanical systems that are properly designed, the dynamic response of the first group is significantly higher than those of the second group. By separating the required actuating forces/torques into the above two groups, the characteristics of the dynamic response of such nonlinear dynamics systems may be determined for a prescribed trajectory. The information can also be used to significantly increase the performance of control systems of such mechanical systems by properly synthesized trajectories and control. When a feed-forward control signal is used, the performance of the system is shown to be significantly improved by generating each one of the group of components separately considering the dynamic response of the actuation system to each one of the groups of components. An example and practical methods of implementing the proposed feed-forward control for nonlinear dynamics systems are provided.

Appendix A: Dynamic Response of Actuation Systems

In this Appendix, and without the loss of generality, the aforementioned methods of separating the actuation forces/torques of a mechanical system into the motion independent components and the motion dependent components and their dynamic response limitations are presented for brushless DC motors that are driven by electronic power amplifiers.

In this Appendix, three different actuator operation cases are presented. In the first case, the actuator is used to apply force/torque without undergoing related motion. Such forces/torques are mostly (but not entirely) reaction forces/torques, and correspond to the aforementioned motion independent components of the actuation forces/torques. In the second case, the actuator is used to apply force/torque to accelerate a load (effective inertia) and overcome back electromotive force (EMF). These actuation forces/torques correspond to the aforementioned motion dependent components of the actuation forces/torques. In the third case, the actuator is used to apply a combination of motion independent components and motion dependent components, a case that is generally encountered in mechanical systems with or without nonlinear dynamics.

Figure 6:
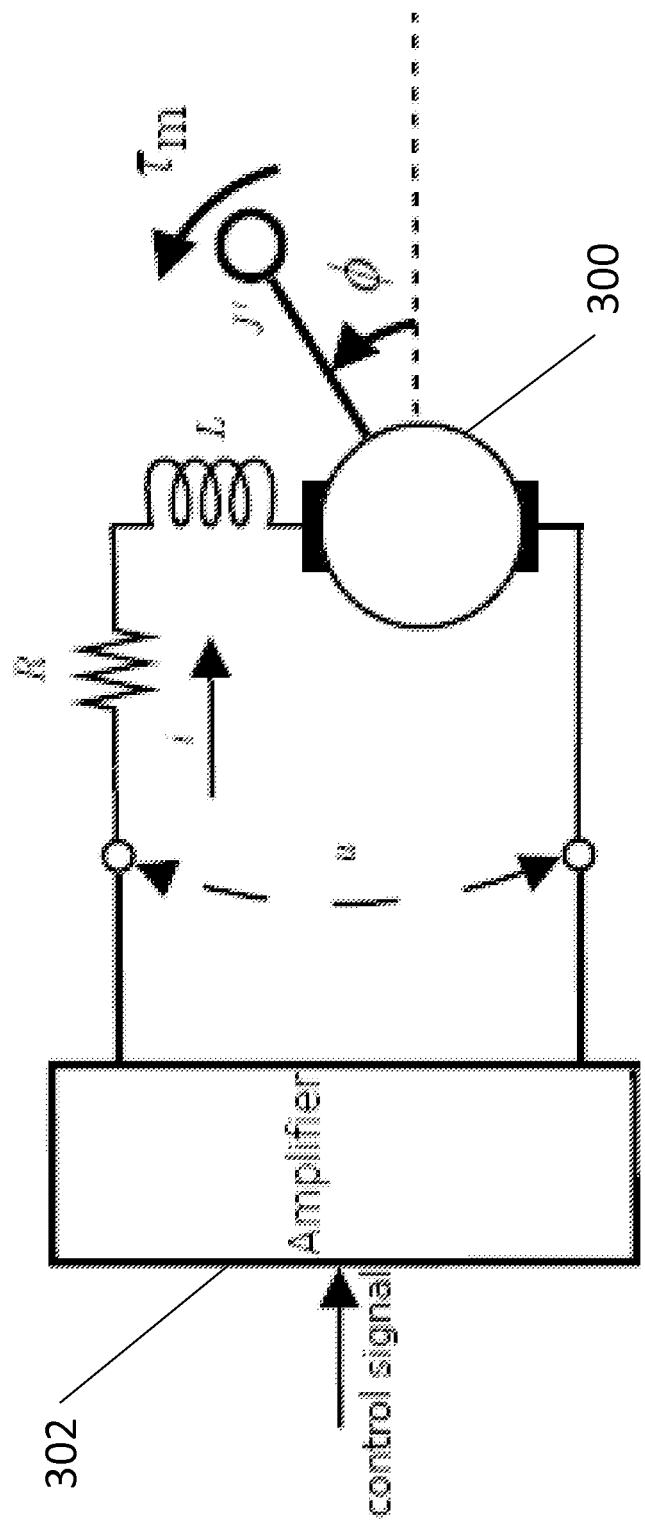
FIG. 6 illustrates a model of a permanent magnet DC brushless electric motor.

A representative model of a permanent magnet brushless rotary motor is shown in FIG. 6. In the model of FIG. 6, $\tau_m$ is an externally applied torque to the motor 300; $\phi$ is the motor motion (rotary for the case of present model); J' is the effective (moment of) inertia (load) experienced by the motor 300; i is the armature current; R and L are the resistance and inductance of armature coil, respectively; and u is the voltage across the armature coil.

The dynamics of brushless DC motor 300 of FIG. 6 can be described by the following two coupled second order ordinary differential equations $$\tau_m = k_t i - J'\ddot{\phi} \tag{10}$$

$$u = iR + L\dot{i} + k_v \dot{\phi} \tag{11}$$

where $k_t$ is the motor torque constant; and $k_v$ is the motor velocity related back EMF coefficient constant, which is determined by the flux density of the permanent magnets, the reluctance of the iron core of the armature, and the number of turns of the armature winding.

In all electric motors, the maximum allowable armature current i and voltage u are limited. These limits are hereinafter indicated by $$i \leq I_{max} \tag{12}$$

$$u \leq U_{max} \tag{13}$$

where $I_{max}$ is the maximum allowable armature current (motor stall current) and $U_{max}$ is allowable armature voltage. In a properly designed actuation system, the electronic power amplifier 302 is designed to provide the above maximum armature current and voltage.

When used to drive a mechanical system, the actuator electronic power amplifier 302 receives a control signal corresponding to the desired actuation force/torque from the system controller and transmits electric current to the motor armature to produce the actuation force/torque.

As an electronic device, the electronic power amplifier dynamic response (for most mechanical system operations, the bandwidth of its linear frequency response) is significantly higher than the dynamic response of any practical mechanical system, even when its inertia load is only the very lightweight rotor of the motor 300. The dynamic response limitation of the actuation system operating a pure inertia load may be approximated by the "cut off" frequency presented later in this Appendix.

Thereby considering the fact that in a properly designed actuation system, such as the one shown in FIG. 6, the dynamic response of the system electronic power amplifier 302 is significantly higher than those of any practical mechanical system, one may safely assume that in operating a properly designed mechanical system, the dynamic response limitations of the system electronic power amplifier 302 could even be neglected. For the system shown in FIG. 6, this assumption also means that for operating a mechanical system, no frequency limitation needs to be considered on the system electronic power amplifier 302 for providing the required voltage u and current i. The aforementioned maximum available voltage, $U_{max}$ and current $I_{max}$ are still applicable.

The Case of No-Motion Force/Torque Application

In this case, the motor 300 is kept stationary, i$\phi$=0 and is only required to provide the torque $\tau_m$ to resist the externally applied torque of the same magnitude but opposite sign. Now let the torque $\tau_m$ be represented in the form of Fourier series with j number of significant harmonics as $$\tau_m = \sum_j a_j \cos(j\omega t + \psi_j)$$

Then from Eqn. (10) and Eqn. (11), the required armature current i and voltage across the coil u are readily seen to become $$i = \frac{\tau_m}{k_t} = \sum_j I_j \cos(j\omega t + \psi_j) \tag{14}$$

$$u = iR + L\dot{i} \tag{15}$$
$$= R\sum_j I_j \cos(j\omega t + \psi_j) - L\sum_j I_j j\omega \sin(j\omega t + \psi_j)$$
$$= \sum_j I_j \sqrt{R^2 + L^2 j^2 \omega^2} \cos(j\omega t + \psi'_j)$$

where $I_j = a_j/k_t$ and $\psi_j$ are the amplitude and phase of the jth harmonic of the required current i.

As can be seen from Eqn. (14) and Eqn. (15), as long as the aforementioned maximum current and voltage levels $I_{max}$ and $U_{max}$ are not reached and as long as the electronic power amplifier can provide the highest harmonic in the torque $\tau_m$, then the actuator can provide the above required torque $\tau_m$.

At this point it might be of interest to note that the corresponding required power P from the electronic power amplifier for generating the above toque $\tau_m$ is $$P = ui = i^2 R + Li\dot{i} \quad (16)$$

Thereby making the average power requirement $$P_{over} = \frac{1}{T}\int_0^T Pdt = \frac{1}{T}\int_0^T i^2 R dt = \sum_j \frac{I_j^2 R}{2} \quad (17)$$

where T is the period of the fundamental frequency $\omega$. As expected, since the actuator does not do any work on a load (inertia), the consumed power is only due to the coil resistance R.

The Case of "Motion-Generating" Actuation Force/Torque

In this section, the actuator is considered to apply a required level of force/torque to a load (effective inertia) to achieve a desired motion (acceleration and velocity) profile. The brushless DC motor and its electronic power amplifier 302 of FIG. 6 is still being used.

In current practice, the frequency response of motor velocity is defined in terms of the armature (with effective load) speed versus voltage and without any externally applied torque ($\tau_m$ in FIG. 6). Using a linear model of the motor, a cut off frequency is then defined using the transfer function between the voltage V(s) and speed $\Omega(s)$ after Laplace transform as $$G(s) = \frac{\Omega(s)}{V(s)/K} = \frac{1}{(s^2/\omega_n^2) + 1} \quad (18)$$

where $K=k_v=k_t$, $\omega_n = K/(LJ')^{1/2}$. The natural frequency $\omega_n$ is considered to be a cut off frequency, i.e., the highest frequency that the electric motor can effectively operate.

From the discussion of the previous no-motion force application case, it is apparent that the above cut off frequency cannot be used to determine the dynamic response of general mechanical systems (even if their dynamics were not non-linear) since it only considers the motion response.

In this section we define a cut off frequency that considers the characteristics of both the electric motor as well as its electronic power amplifier. Here, a cut off frequency $\omega_c$ is still defined in the absence of any externally applied force/torque to the motor and the limiting factors considered are the aforementioned maximum current $I_{max}$ and maximum voltage $U_{max}$ that the electronic power amplifier can provide and that the motor armature can tolerate.

Consider the case in which the motor is undergoing the simple harmonic motion $$\varphi = \lambda_\phi \cos \omega_\phi t \quad (19)$$

By substituting the motion of Eqn. (19) into Eqn. (10) and setting the externally applied torque $\tau_m = 0$, and for the aforementioned maximum armature current of $I_{max}$, we get $$k_t I_{max} \cos \omega_c t = J' \lambda_\phi \omega_c^2 \cos \omega_c t \quad (20)$$

From which our previously described cut off frequency can be seen to become $$\omega_c = \sqrt{\frac{k_t I_{max}}{\lambda_\phi J'}} \quad (21)$$

As can be expected, Eqn. (21) indicates that higher the maximum current $I_{max}$ and lower the motion amplitude and motor inertia load, higher will be the maximum motion or cut off frequency as previously defined.

In addition, from Eqn. (11), the voltage u required to achieve the motion Eqn. (19) at the cut off frequency $\omega_c$ becomes $$u = I_{max} R \cos \omega_c t - (LI_{max} + k_v \lambda_\phi) \omega_c \sin \omega_c t \quad (22)$$

$$= \sqrt{I_{max}^2 R^2 + (LI_{max} + k_v \lambda_\phi)^2 \omega_c^2} \cos(\omega_c t + \alpha)$$

where $\alpha = \arccos \dfrac{I_{max} R}{\sqrt{I_{max}^2 R^2 + (LI_{max} + k_v \lambda_\phi)^2 \omega_c^2}}$ Eqn. (22) provides the corresponding level of voltage that the electronic power amplifier has to provide. However, this is not the maximum voltage that the electronic power amplifier has to provide since during the motion, the motor velocity generates back EMF, which the electronic power amplifier must also counter. The maximum level of generated back EMF voltage is proportional to the motor velocity, which becomes higher with higher motion frequency and amplitude, Eqn (19)

The Case of Combined External and Motion-Generated Actuation Force/Torque

Now consider the case in which the motor is providing the simple harmonic motion described by Eqn. (19) while at the same time it has to resist and externally applied torque $$\tau_m = \lambda_m \cos \omega_m t \quad (23)$$

Substituting Eqn. (23) and Eqn. (19) into Eqn. (10) and solving for the current i, we obtain $$i = \frac{1}{k_t}(-J'\lambda_\phi \omega_\phi^2 \cos \omega_\phi t + \lambda_m \cos \omega_m t) \quad (24)$$

Eqn. (24) clearly shows that required i can be separated into two distinct components. The first (left) component being motion related, and its magnitude increases with the load (effective inertia), amplitude of the simple harmonic motion and square of the motion frequency. This component of the required current corresponds to the aforementioned motion dependent component of the actuating torque. The ability of the motor to provide this component of the torque is limited by the aforementioned cut off frequency $\omega_c$, and the system maximum current $I_{max}$ and maximum voltage $U_{max}$ that either the electronic power amplifier 302 can provide or that the motor armature can withstand.

The second component is not motion related and is due to the reaction that the motor has to provide to resist the externally applied torques. This component corresponds to the aforementioned motion independent component of the actuating torque. And the ability of the motor to provide this component of the torque is only limited by the system maximum current $I_{max}$ and maximum voltage $U_{max}$, and the dynamic (frequency) response of the electronic power amplifier, which if it is properly designed, is orders of magnitude higher than the motor cut off frequency $\omega_c$.

The corresponding required voltage u can then be obtained from Eqn. (11) to be $$u = \frac{R}{k_t}(\lambda_m \cos \omega_m t - J'\lambda_\phi \omega_\phi^2 \cos \omega_\phi t) - \quad (25)$$

-continued $$\frac{L}{k_t}(\lambda_m \omega_m \sin\omega_m t - J'\lambda_\phi \omega_\phi^3 \sin\omega_\phi t) - k_v \lambda_\phi \omega_\phi \sin\omega_\phi t$$

$$= \frac{\lambda_\phi \omega_\phi}{k_t}\sqrt{J'^2\omega_\phi^2 R^2 + (J'\omega_\phi^2 L + k_t k_v)^2} \cos(\omega_\phi t + \alpha_\phi) +$$

$$\frac{\lambda_m}{k_t}\sqrt{R^2 + L^2\omega_m^2} \cos(\omega_m t + \alpha_m)$$

where $\alpha_m$ and $\alpha_\phi$ are the phases. The Eqn. (25) clearly shows that similar to the required current, Eqn. (24), the required voltage u also has the aforementioned two distinct components.

The first (left) component being motion related, and its magnitude increases with the load (effective inertia), amplitude of the simple harmonic motion and its frequency. This component of the required current corresponds to the aforementioned motion dependent component of the actuating torque. The ability of the motor 300 to provide this component of the torque is limited by the aforementioned cut off frequency $\omega_c$, and the system maximum current $I_{max}$ and maximum voltage $U_{max}$ that either the electronic power amplifier can provide or that the motor armature can withstand.

The second component is not motion related and is due to the reaction that the motor has to provide to resist externally applied torques. This component corresponds to the aforementioned motion independent component of the actuating torque. And the ability of the motor 300 to provide this component of the torque is only limited by the system maximum current $I_{max}$ and maximum voltage $U_{max}$, and the dynamic (frequency) response of the electronic power amplifier, which if it is properly designed, is orders of magnitude higher than the motor cut off frequency $\omega_c$.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method of controlling an actuation device to move an actuator, the method comprising acts of:
    receiving information on a starting first position and an indication of an actuator output to move the actuator from the starting first position to a second position;
    dividing the indicated actuator output into motion dependent components and motion independent components;
    determining a difference between the first and second positions;
    combining the difference between the first and second positions with the motion dependent components producing a first combined result;
    filtering the first combined result removing one or more high frequency components beyond a dynamic response capability of the actuator producing a first filtered result;
    combining the first filtered result with the motion independent components producing a second combined result;
    converting the second combined result to a power signal for driving the actuator; and
    driving the actuator with the power signal.

2. The method of claim 1, comprising acts of:
    determining an updated first position resulting from driving the actuator;
    repeating the acts of determining the difference, combining the difference, filtering the first combined result, combining the first filtered result, converting the second combined result and driving the actuator for a given period of time.

3. The method of claim 1, wherein the indication of the motion includes both a force and a torque component and the act of dividing comprises acts of determining force and torque motion dependent components and force and torque motion independent components.

4. The method of claim 1, wherein the act of determining the difference between the first and second positions comprises an act of subtracting the second position from the first position to determine the difference.

5. The method of claim 1, wherein the act of combining the difference between the first and second positions with the motion dependent components comprises an act of adding the difference between the first and second positions to the motion dependent components to produce the first combined result.

6. The method of claim 1, wherein the act of combining the first filtered result with the motion independent components comprises an act of adding the first filtered result with the motion independent components to produce the second combined result.

7. The method of claim 1, comprises an act of moving an object to the second position by the driven actuator.

8. The method of claim 1, wherein the actuator is a robotic manipulator.

9. The method of claim 1, wherein the actuator is a motor.

10. The method of claim 9, wherein the indication of the motion includes both a force and a torque component and the act of dividing comprises acts of determining force and torque motion dependent components and force and torque motion independent components.

11. The method of claim 1, wherein the motion to move the actuator includes a related velocity and acceleration.

12. An apparatus for controlling an actuator, the device comprising:
    an actuator; and
    a control portion coupled to the actuator, wherein the control portion comprises:
        an input portion to receive information on a starting first position and an indication of an actuator output to move the actuator from the starting first position to a second position,
        a separator configured to separate the indicated actuator output into motion dependent components and motion independent components,
        a subtractor coupled to receive the information on the first and second positions to produce a difference between the first and second positions,
        a first adder coupled to receive the difference between the first and second positions and the motion dependent components to produce a first combined result,
        a low pass filter coupled to receive the first combined result removing one or more high frequency components beyond a dynamic response capability of the actuator to produce a first filtered result, and
        a second adder coupled to receive the first filtered result and the motion independent components to produce a second combined result to drive the actuator.

13. The apparatus of claim 12, comprising an amplifier coupled to receive the second combined result to produce a power signal to drive the actuator.

14. The apparatus of claim 12, wherein the separator is configured to separate the indicated motion into force and torque motion dependent components and force and torque motion independent components.

15. The apparatus of claim 12, wherein the actuator is a robotic manipulator.

16. The apparatus of claim 12, wherein the actuator is a motor.

17. A robotic manipulator comprising:

an actuator; and and a control portion coupled to the actuator, wherein the control portion comprises:

- an input portion to receive information on a starting first position and an indication of an actuator output to move the actuator from the starting first position to a second position,
- a separator configured to separate the indicated actuator output into motion dependent components and motion independent components,
- a subtractor coupled to receive the information on the first and second positions to produce a difference between the first and second positions,
- a first adder coupled to receive the difference between the first and second positions and the motion dependent components to produce a first combined result,
- a low pass filter coupled to receive the first combined result removing one or more high frequency components beyond a dynamic response capability of the actuator to produce a first filtered result, and
- a second adder coupled to receive the first filtered result and the motion independent components to produce a second combined result to drive the actuator.

18. The robotic manipulator of claim 17, comprising an amplifier coupled to receive the second combined result to produce a power signal to drive the actuator.

\* \* \* \* \*